Patented June 27, 1944

2,352,582

UNITED STATES PATENT OFFICE 2,352,582

MANUFACTURE OF ESTERS

Howard E. Worne, Newark, N. J., assignor to Samuel Brass, Newark, N. J.

No Drawing. Application December 27, 1940, Serial No. 371,983

2 Claims. (Cl. 260—486)

This invention relates to the manufacture of alkyl esters of unsaturated aliphatic monocarboxylic acids having a lower alkyl group substituted in the alpha position, such, for example, as methyl methacrylate, and has for its principal object to provide an improved method whereby the reactions by which such compounds are formed are caused to proceed rapidly and to give high yields.

A common method for the manufacture of alkyl esters of the character described, such, for example, as alkyl methacrylates, involves preparing an alkyl cyanhydrin by reaction of a lower alkyl ketone (acetone, if a methacrylate is to be produced) with a cyanide in an acid medium, and reacting the cyanhydrin thus produced with a lower aliphatic alcohol to form the desired ester. Ordinarily both of these reactions are carried out in an acid medium. The reactions proceed quite slowly, and the yields obtained are only fair.

The present invention provides an improved process for the manufacture of alkyl esters of unsaturated aliphatic monocarboxylic acids having a lower alkyl group substituted in the alpha position. The new process makes use of the known reactions outlined above, but is carried out in the presence of a catalyst which very much reduces the time required for the reactions to proceed substantially to completion, and which leads to substantially higher yields than have heretofore been obtained. In accordance with the invention the cyanhydrin is formed by reaction of a lower alkyl ketone and a cyanide in an acid medium and in the presence of mercuric ions as the catalyst. The cyanide employed may be any of the cyanides customarily used in cyanhydrin reactions, such, for example, as a cyanide of an alkali metal. The cyanhydrin thus formed is separated from the other reaction products, and the separated cyanhydrin is caused to react with a lower aliphatic alcohol in an acid medium and in the presence of mercuric ions as a catalyst to form the ester.

The invention is of particular significance in the manufacture of methyl methacrylate and closely related compounds. Mercuric ions, however, are capable of catalyzing the reaction which takes place between any of the lower alkyl ketones and a cyanide to form the corresponding cyanhydrin, and are capable of catalyzing the reaction between any of the lower aliphatic alcohols and such cyanhydrins to form the corresponding esters. The improved method of the invention, therefore, is not limited to the production of any particular ester of any particular acid of the character described.

Any mercuric compound capable of yielding mercuric ions in the reaction mixture or solution may be employed to provide the mercuric ion catalyst. The reactions referred to above customarily are carried out in acid solutions, however, and accordingly a mercuric salt soluble in and capable of yielding mercuric ions in such a solution may be employed with advantage to provide the mercuric ion catalyst. Inasmuch as sulphuric acid is the acid usually employed to provide the acid medium, the corresponding mercuric salt, that is, mercuric sulphate, is generally preferred as the source of mercuric ions. Other soluble mercuric salts, such, for example, as mercuric chloride, mercuric cyanide, or mercuric acetate, may however be employed, if the anion of the mercuric compound is not considered objectionable.

In accordance with the method of the invention using mercuric ions to catalyze the formation of the cyanhydrin, the yield of this product is increased from about 60–75%, as heretofore obtained to 85–90%. Similarly the use of mercuric ions to catalyze the esterification reaction results in an increase in yield from about 75% as heretofore obtained to 90–98%. In both cases the time for the reaction to proceed substantially to its end point is reduced by the mercuric ion catalyst to only about one-half of the time heretofore required.

Following is an example of the preparation of methyl methacrylate which is illustrative of the method of the invention. Parts given are by weight.

Fifty-eight parts (one molar part) of acetone and forty-nine parts (one molar part) of sodium cyanide are mixed with 500 parts of water and the mixture is introduced into a reaction vessel, preferably one fitted with an efficient stirrer. The temperature of the mixture in the vessel is reduced to about 10–15° C. About fourteen parts (1/20 molar part) of mercuric sulphate is dissolved in about 415 parts of 40% sulphuric acid (corresponding in amount to about 1½ molar parts of 100% $H_2SO_4$). The resulting solution of mercuric sulphate and sulphuric acid is then added to the cold mixture of acetone and sodium cyanide with rapid agitation. The rate of addition of the acid solution to the acetone-cyanide mixture is sufficiently slow so that the temperature of the mixture does not rise to above about 15° C.

When all of the sulphuric acid-mercuric sulphate solution has been added, the temperature of the mixture is reduced to about −5° C. The acetone cyanhydrin formed in the course of the reaction is then decanted from the residual reaction mixture. This residue may be extracted with half its volume of diethyl ether and the resulting extract may be added to the decanted cyanhydrin. The cyanhydrin may be dried over anhydrous sodium sulphate, and the dry product may be subjected to distillation to remove the ether. Alternatively, the acetone cyanhydrin may be separated substantially completely from the residual reaction mixture by a high speed centrifuging operation.

The yield of acetone cyanhydrin after distillation amounts to about 85% to 90% of the theoretical, which represents a substantial improvement over the yields of 60% to 75% heretofore obtained. The time required for the reaction between the cyanide and the acetone is only about one-half as long when using the catalyst of the invention as it is when no catalyst is employed.

To one molar part of the acetone cyanhydrin is added one molar part of methyl alcohol and one molar part of concentrated sulphuric acid containing in solution 1/20 molar part of mercuric sulphate. To this mixture may be added one-half of one per cent, more or less, of diphenylamine, hydroquinone, or other agent capable of preventing polymerization of the ester to be formed. This mixture is heated in an autoclave, preferably a glass-lined autoclave, at a temperature of about 105° to 110° C. until the reaction has proceeded substantially to completion. The reaction mixture is then removed from the autoclave and is subjected to distillation. The fraction removed between about 95° and 110° C. is collected as commercial methyl methacrylate. The yield obtained runs between 90% and 98% of the theoretical, which represents a substantial improvement over the 75% yields heretofore obtained without the use of the catalyst of the invention. The time required for the reaction between the cyanhydrin and the alcohol in the presence of the mercuric ion catalyst is only about one-half as long as the time required for the same reaction in the absence of a catalyst.

In addition to methyl methacrylate, other esters of unsaturated aliphatic monocarboxylic acids having a lower alkyl group substituted in the alpha position, such, for example, as ethyl methacrylate, propyl methacrylate, methyl ethacrylate, and the like, may be prepared with advantage by the method of the invention, using mercuric ions to catalyze the reactions by which the cyanhydrin is formed, and also to catalyze the reaction by which the ester is produced from the cyanhydrin.

Dissolution of the mercuric salt in the acid, as in the case of the example described above, is a particularly convenient manner in which to introduce the mercuric catalyst into catalytic relation with the reactive constituents, but it is understood that the catalyst may be added in other ways. For example, in the production of the cyanhydrin, the catalyst may be dissolved in the water mixed with the acetone or other ketone and with the cyanide. Likewise in the production of the ester from the cyanhydrin, the mercuric salt may be added to the mixture separately, or it may be incorporated in either the alcohol or the cyanhydrin preparatory to introducing such reactant into the autoclave.

I claim:

1. In a process of the character described involving formation of an alkyl ester of an unsaturated aliphatic monocarboxylic acid having a lower alkyl group substituted in the alpha position by reaction of an alkyl cyanhydrin with a lower aliphatic alcohol in an acid medium, the improvement which comprises conducting such reaction in the presence of mercuric ions as a catalyst.

2. In a process of the character described involving formation of methyl methacrylate by reaction of acetone cyanhydrin with methyl alcohol in a sulphuric acid medium, the improvement which comprises conducting such reaction in the presence of dissolved mercuric sulphate as a catalyst.

HOWARD E. WORNE.